United States Patent
Jenkins

(10) Patent No.: US 9,075,893 B1
(45) Date of Patent: Jul. 7, 2015

(54) PROVIDING FILES WITH CACHEABLE PORTIONS

(75) Inventor: Jonathan A. Jenkins, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 543 days.

(21) Appl. No.: 13/035,721

(22) Filed: Feb. 25, 2011

(51) Int. Cl.
G06F 15/16 (2006.01)
G06F 17/30 (2006.01)
G06F 12/08 (2006.01)

(52) U.S. Cl.
CPC ...... *G06F 17/30902* (2013.01); *G06F 12/0862* (2013.01)

(58) Field of Classification Search
CPC .......... G06F 17/30902; G06F 17/3089; G06F 17/2211; G06F 17/30864; H04L 67/2842; H04L 67/2852
USPC ................. 709/203, 212, 213, 219, 237, 218; 707/805
See application file for complete search history.

(56) References Cited

U.S. PATENT DOCUMENTS

| | | | | |
|---|---|---|---|---|
| 5,946,697 | A * | 8/1999 | Shen | 715/205 |
| 6,192,382 | B1 | 2/2001 | Lafer et al. | |
| 6,192,398 | B1 * | 2/2001 | Hunt | 709/213 |
| 2001/0042099 | A1 * | 11/2001 | Peng | 709/206 |
| 2002/0054161 | A1 * | 5/2002 | Durham | 345/841 |
| 2002/0112032 | A1 * | 8/2002 | Martin et al. | 709/219 |
| 2003/0041093 | A1 * | 2/2003 | Yamane et al. | 709/201 |
| 2003/0046365 | A1 * | 3/2003 | Pfister et al. | 709/219 |
| 2003/0110272 | A1 * | 6/2003 | du Castel et al. | 709/229 |
| 2003/0120752 | A1 * | 6/2003 | Corcoran | 709/219 |
| 2003/0191812 | A1 * | 10/2003 | Agarwalla et al. | 709/217 |
| 2004/0172495 | A1 * | 9/2004 | Gut et al. | 711/1 |
| 2005/0273706 | A1 * | 12/2005 | Manber et al. | 715/513 |
| 2006/0064467 | A1 * | 3/2006 | Libby | 709/217 |
| 2007/0101061 | A1 * | 5/2007 | Baskaran et al. | 711/118 |
| 2007/0299886 | A1 * | 12/2007 | Novak | 707/203 |
| 2008/0195819 | A1 * | 8/2008 | Dumont | 711/138 |
| 2008/0228864 | A1 * | 9/2008 | Plamondon | 709/203 |
| 2009/0254707 | A1 * | 10/2009 | Alstad | 711/118 |
| 2010/0088612 | A1 * | 4/2010 | Jia et al. | 715/745 |

(Continued)

OTHER PUBLICATIONS

Tate, Bruce, "Real world Rails: Caching in Rails", dated May 15, 2007, available at http://www.ibm.com/developerworks/web/library/wa-rails1/; 12 pages.

(Continued)

*Primary Examiner* — Brian J Gillis
*Assistant Examiner* — Shean Tokuta
(74) *Attorney, Agent, or Firm* — Knobbe, Martens, Olson & Bear, LLP

(57) ABSTRACT

Systems and methods are provided for enabling caching of one or more portions of a file. In some embodiments, a first file may be sent to a client system, where the first file includes a cache identifier identifying a shared portion of content of the first file, where the shared portion of content is included in both the first file and at least one other file. A request may be received from the client system for a second file that includes the shared portion of content. A modified second page may then be sent to the client system, where the modified second page includes the cache identifier, and does not include the shared portion of content, such that the client system may determine the content of the second page based on the modified second page and the previously stored shared portion of content.

19 Claims, 7 Drawing Sheets

(56) References Cited

U.S. PATENT DOCUMENTS

2010/0191805 A1* 7/2010 Lu et al. .................. 709/203
2011/0029641 A1* 2/2011 Fainberg et al. ............. 709/219
2011/0047470 A1* 2/2011 Perron et al. .................. 715/738
2011/0055683 A1* 3/2011 Jiang ............................ 715/234

OTHER PUBLICATIONS

"Fragment Caching", yiiframework.com, available at http://www.yiiframework.com/doc/guide/1.1/en/caching.fragment (available at least as early as Dec. 17, 2010); 4 pages.

* cited by examiner

PROVIDING FILES WITH CACHEABLE PORTIONS

BACKGROUND

Client computing devices may request files, such as web pages, from one or more servers over a network. A client computing device that receives pages or other files from a server may locally store or cache the received files. The cached copies of the files may be presented for display again in the future from cache memory without sending a second request to the server, and without receiving the files from the server a second time. For example, a client computing device may receive from a server a page, such as a HyperText Markup Language ("HTML") page, that include references to one or more image files or other files that are to be presented for display. The client computing device may then request the one or more image files from the appropriate server and present the image files for display, along with other content of the page. The client computing device may additionally store the one or more image files in a data store local to or accessible to the client computing device. These locally stored cached copies of the one or more image files may then be presented for display as part of a subsequently requested page that includes references to the same image files, provided that certain conditions are met. In this manner, the number of file requests to the server in order to display the subsequently requested page is less than if the client computing device requested the previously received images files a second time, rather than retrieve locally cached copies of the image files. However, if a subsequently requested file differs from a previously received file, the client computing device typically must receive the subsequently requested file in full.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
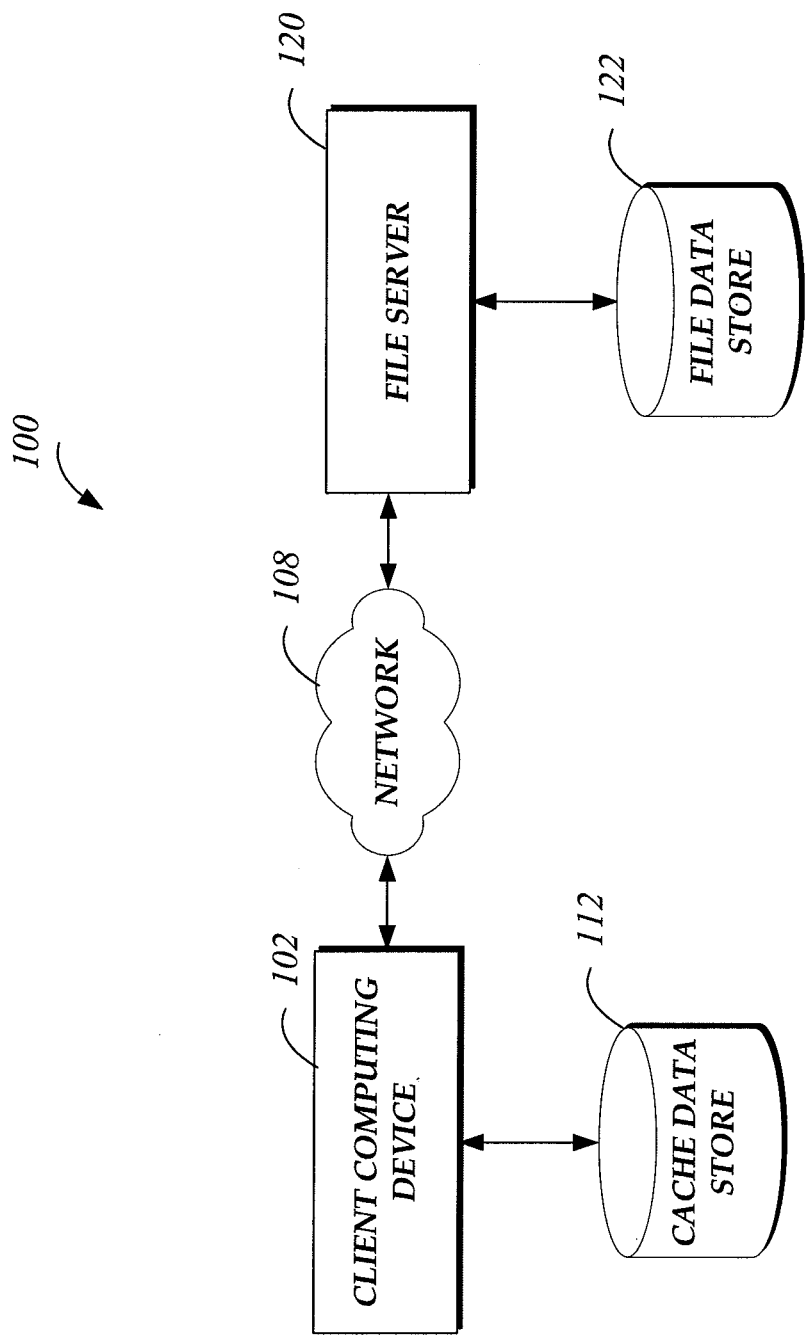
FIG. 1 depicts an illustrative operating environment in which a client computing device may request one or more files from a file server, and may store portions of one or more of the received files in a cache data store.

Generally described, aspects of the present disclosure relate to systems and methods for enabling a portion of a page or other file received from a server to be stored or cached by a client computing device, such that the client computing device may incorporate the stored portion into a subsequently received page or other file. As discussed above, existing systems may enable a client computing device to store a cache copy of an entire file, such as an HTML page or an image referenced in an HTML page. However, in order to optimize the delivery of an initial page or other file to a client computing device, developers often attempt to include as many elements as possible into a single file, such as by including inline code segments in an HTML file, rather than referencing smaller separate files that could potentially be separately cached by the client computing device. One reason that a developer may construct pages as a single file rather than as a smaller file that references other files is that a single file construction may require fewer Transmission Control Protocol ("TCP") or Internet Protocol ("IP") connections in order to deliver the total page content on the initial page load. A drawback to such an approach when used with existing systems, however, is that these inline elements can typically not be cached by the client computing device to be reused for subsequent page loads. Accordingly, subsequently requested pages that have elements or portions in common with a page previously received by the client computing device must typically be received in full (including the common or shared portions) as a result of each request. Aspects of the present disclosure enable a page or other file to be constructed in a manner that minimizes connection requests to a server, while also enabling one or more portions of the file to be separately stored as cache copies by the client computing device, such that the one or more portions may be reused by the client computing device by incorporating the portions into a subsequently requested page.

In certain embodiments, a file server as disclosed herein may receive a first request from a client system for a first file. In response to the first request, the file server may send to the client system the first file. The first file sent to the client system may include a cache identifier identifying a shared portion of content of the first file, where the shared portion of content is included in both the first file and at least one other file accessible via the file server. The file server may then receive a request from the client system for a second file that includes the shared portion of content that was included in the first file. The file server may then determine whether the client system has stored the shared portion of content of the first file. If the file server determines that the client system has not stored the shared portion of content, the file server may send the second file to the client system, where the second file sent to the client system includes the shared portion of content. If instead the file server determines that the client system has stored the shared portion of content, the file server may then send to the client system a modified second file that includes the cache identifier, but does not include the shared portion of content. The client system may then determine the full content of the second file based on the modified second file and the previously stored shared portion of content.

In some embodiments, the cache identifier may be added by a developer or creator of the file. In other embodiments, the cache identifier may be added to the first and/or second file automatically as a result of the file server determining shared portions of content that appear in two or more files stored in a file data store associated with the file server. For example, the file server may automatically determine a shared portion of content by comparing content of the first file and the second file, and optionally additional files. The file server may then automatically add the cache identifier to the first file, the second file, and/or other files that include the shared portion of content.

A "file" as used herein may refer to content of a variety of types, including content that may be streamed to a client computing device and/or assembled in response to a user request. A page, which may be one example of a file, may include text and/or code of various types, such as JavaScript, HTML, Cascading Style Sheets ("CSS"), etc. While an example of a file as a page may be used herein, it will be appreciated that a file may include, but is not limited to, audio data, video data, text data, and/or other forms of data or content. For example, a portion of streaming video content, such as an advertisement portion of a video feed, may be stored as a shared portion in a cache data store, such that the advertisement or other shared portion may be incorporated in a subsequently requested video file or stream without being received a second time from a server.

FIG. 1 depicts an illustrative operating environment 100 in which a client computing device 102 may request one or more files from a file server 120, and then may store or "cache" portions of one or more of the received files in the cache data store 112. The depicted environment 100 includes a client computing device 102 and a file server 120 communicatively connected by a network 108, such as the Internet. Those skilled in the art will recognize that the client computing device 102 may be any of a number of computing devices that are capable of communicating over a network including, but not limited to, a laptop, personal computer, tablet computer, electronic book reader, personal digital assistant (PDA), hybrid PDA/mobile phone, mobile phone, and the like. In some embodiments, the client computing device 102 may include computer hardware and software components similar to those described below with respect to the file server 120.

As further illustrated in FIG. 1, the file server 120 includes or communicates with a file data store 122. The file data store 122 may include files of one or more types, including, but not limited to, pages (which may include code and other text to be interpreted or executed by a computing device, such as the client computing device 102), video files, audio files, etc., as discussed above. Those skilled in the art will appreciate that the file data store 122 may be local to the file server 120, may be remote to the file server 120, and/or may be a network-based service itself. As illustrated, the client computing device 102 includes or communicates with a cache data store 112. The cache data store 112 may include shared portions of one or more files that have been received by the client computing device 102 from the file server 120, and may include cache identifier information identifying each stored shared portion. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2A:
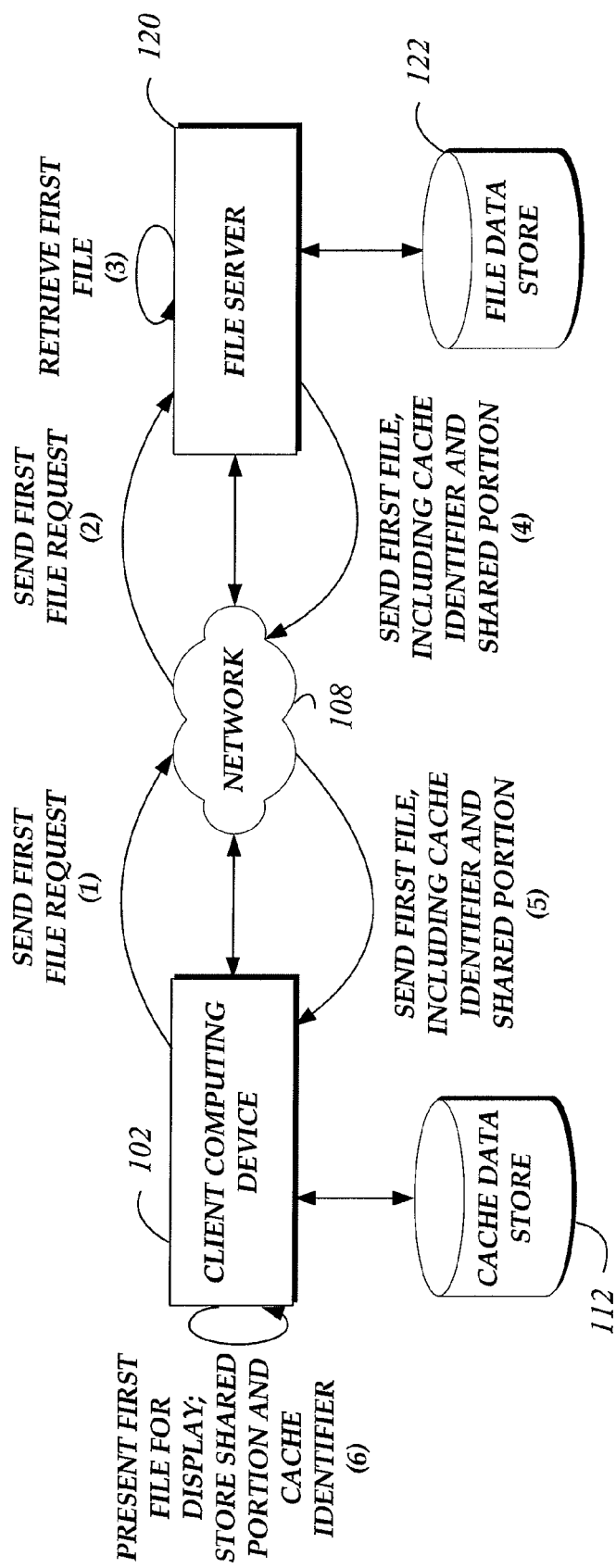
FIG. 2A is a block diagram illustrating a client computing device within the operating environment of FIG. 1 requesting a first file from a file server, and storing a shared portion of the first file in a cache data store.

FIG. 2A is a block diagram illustrating the client computing device 102 within the operating environment 100 of FIG. 1 requesting a first file from the file server 120 and storing a shared portion of the first file in the cache data store 112. For purposes of this example, the "first file" refers to a file that is requested and received by the client computing device 102 prior to any shared portions of the file being stored in the cache data store 112. As illustrated, the client computing device 102 sends a first file request to the file server 120. The first file request may be, for illustrative purposes, a request for a page. The page may include code, such as HTML code, as well as other text. The client computing device 102 may send the first file request, for example, as a result of a page request generated by a web browser installed on the client computing device 102. Once the file server 120 receives the first file request, the file server 120 may retrieve the first requested file from the file data store 122. The file server 120 may then send the first requested file to the client computing device 102. The first file sent to the client computing device 102 may include a cache identifier associated with a "shared portion" of the first file, which may be a portion of the first file that the file server 120 has determined is also included in one or more additional files stored in the file data store 122. The presence of the cache identifier may indicate to the client computing device that the shared portion should be stored or cached by the client computing device 102. The file server 120 may have made the determination that a shared portion is included in the first file based on comparing the content of files in the file data store 122, as discussed below with reference to FIG. 6. In other embodiments, the cache identifier may have been added to the first file by an author or creator of the first file, an operator associated with the file server 120, or another individual or entity associated with the file server 120 and/or the first file. An example of the manner in which a cache identifier may identify a shared portion of a file is discussed below with reference to FIGS. 4 and 5.

When the client computing device 102 receives the first file from the file server 120, the client computing device 102 may present the first file. For example, if the first file is a page, video, or other file that may be displayed, the client computing device may present the first file for display. If the first file includes audio data, the client computing device may cause playback of the audio data. If the first file is a page that includes references to additional files, such as an image, a file containing additional code, a video, etc., the client computing device 102 may request the additional files from the file server 120 and/or one or more additional servers (not illustrated). The content of the page, optionally including additional files that are associated with or referenced by the page, may be presented for display, for example, as a user interface displayed via a navigation interface such as a web browser installed on the client computing device 102. The client computing device 102 may store in the cache data store 112 the shared portion (or multiple shared portions) that are identified in the first file, as indicated by one or more cache identifiers or other indicators present in the first file.

The shared portion may be caused to be stored or cached in a data store, such as the cache data store 112, by software operating on the client computing device, such as a web browser. For example, in some embodiments, a browser configured to identify and store shared portions of a file may have been previously installed on the client computing device 102. Alternatively, a browser plug-in or other add-on software associated with a browser may be installed on the client computing device 102 in order to identify and store shared portions of a file. In other embodiments, code, such as JavaScript, included in the first page received from the file server 120 (or in an additional file received from the file server 120) may be executed by the client computing device 102 in order to determine shared portions of the first file and store the shared portions in a data store local to or accessible to the client computing device 102. The information stored in the cache data store may include, for example, each shared portion in the first file, along with a cache identifier identifying each shared portion. In some embodiments, additional information associated with each shared portion may be stored in the cache data store 112, such as an expiration day and/or expiration time associated with the shared portion.

Figure 2B:
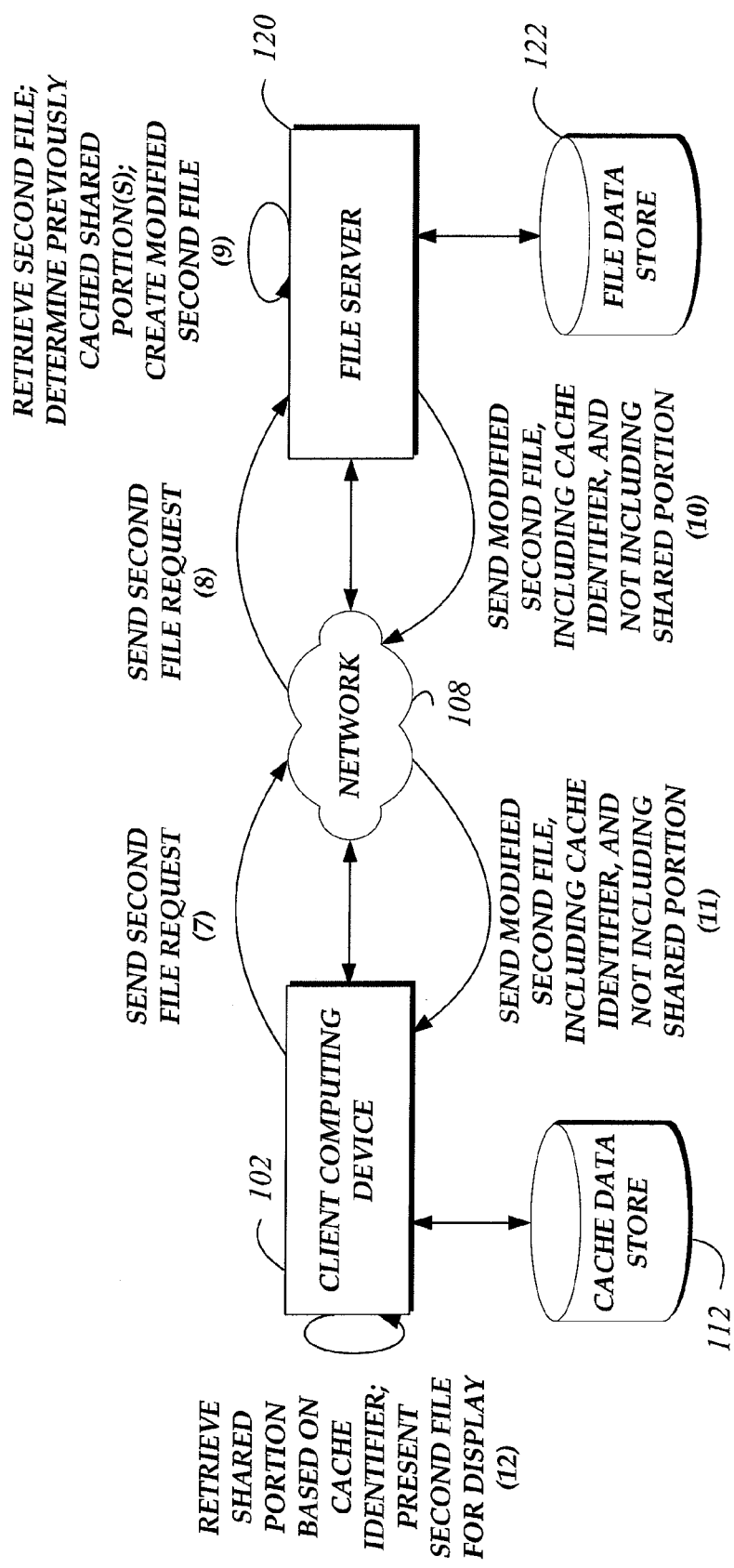
FIG. 2B is a block diagram illustrating a client computing device within the operating environment of FIG. 1 requesting a second file from the file server, and presenting the second file for display based on a modified second file received from the file server and the shared portion previously stored in the cache data store.

FIG. 2B is a block diagram illustrating the client computing device 102 within the operating environment 100 of FIG. 1 requesting a second file from the file server 120, and presenting the second file for display based on a modified second file received from the file server 120 and the shared portion previously stored in the cache data store 112. For purposes of this example, the "second file" refers to a file that is requested and received by the client computing device 102 after at least one shared portion in the second file has been received by the client computing device 102 and stored in the cache data store 112. For example, a given shared portion may be included in both the first file previously received by the client computing device 102 and the second file being requested. As illustrated, the blocks depicted in FIG. 2B occur after the blocks in FIG. 2A have occurred, although other files (not illustrated) may have been received by the client computing device 102 in between the first file described above with respect to FIG. 2A being received and the second file described below with respect to FIG. 2B being received.

As illustrated in FIG. 2B, the client computing device 102 sends a second file request to the file server 120. The second file request may be, for illustrative purposes, a request for a page after the client computing device has already received the first page from the file server 120, as discussed above with reference to FIG. 2A. Once the file server 120 receives the second file request, the file server 120 may retrieve the second requested file from the file data store 122. The file server 120 may then determine whether the second requested file includes any shared portions that have been previously sent to and stored by the client computing device 102. In some embodiments, the file server 120 may make such a determination, in part, by determining whether the second file retrieved from the file data store 122 includes any cache identifiers, and whether any of the shared portions associated with these cache identifiers have been previously sent to the client computing device 102. In some embodiments, the file server may additionally determine whether the client computing device 102 is capable of recognizing and storing shared portions of files (not illustrated). For example, the file server 120 may receive information from the client computing device 102 indicating the capability of the client computing device 102 to store and retrieve shared portions (such as by indicating to the file server 120 version information of a browser operating on the client computing device 102). The client computing device 102 may additionally or alternatively send information to the file server 120 identifying each cache identifier for which the client computing device 102 has stored a corresponding shared portion in the cache data store 112 (which the client computing device 102 may store in one or more data stores as a "cookie" or other data file associated with a user's browsing history). In other embodiments, the file server 120 may assume that if a given shared portion and cache identifier were previously sent to the client computing device 102, then the client computing device 102 has stored the shared portion and is capable of retrieving the shared portion from a local data store, such as the cache data store 112, or from another data source other than the file server 120.

If the file server 120 determines that the client computing device 102 has not previously cached or stored any portions of the second file, the file server may send the second file to the client computing device 102 (not illustrated). If instead the file server 120 determines one or more shared portions of the second file that have been previously cached or stored by the client computing device 102, the file server 120 may create a modified second file. As will be discussed below with respect to FIGS. 4 and 5, the file server 120 may create the modified second file by including all of the content of the retrieved second file other than the shared portions that have been previously cached or stored by the client computing device 102. The file server 120 may, in some embodiments, include in the modified second file the cache identifier corresponding to each previously cached shared portion in place of the shared portion itself, as will be discussed below. If the second file includes one or more previously cached shared portions and one or more shared portions that have not yet been cached by the client computing device 102, the file server 120 may include, in the modified second file, the shared portion(s) that have not been previously cached, while not including the shared portion(s) that have been previously cached. Accordingly, the modified second file, and/or one or more additional files subsequently sent to the client computing device 102, may include cache identifiers identifying previously cached content while also including additional shared portions of content to be cached or stored by the client computing device 102 (as well as corresponding cache identifiers). As will be appreciated, it is not necessary that the file server 120 actually store the modified second file. For example, in some embodiments, the modified second file may be sent to the client computing device 102 as it is constructed by the file server 120.

As illustrated, the file server 120 may send the modified second file to the client computing device 102. The modified second file may include cache identifiers identifying one or more shared portions previously sent to the client computing device 102 as part of a previously sent file (in this example, as part of the first file discussed above with reference to FIG. 2A). When the client computing device 102 receives the modified second file from the file server 120, the client computing device 102 may retrieve from the cache data store 112 the shared portions corresponding to the cache identifiers included in the modified second file. The client computing device 102 may then determine the content of the second file by inserting the shared portions into the modified second file at the locations of the corresponding cache identifiers in the modified second file. Accordingly, the client computing device 102 may effectively recreate the full content of the second file that is stored in the file data store 122 based on the smaller, modified second file received from the file server 120 in combination with stored portions of one or more previously received files. The client computing device 102 may then present the content of the second file (as determined from the content of the modified second file and the retrieved shared portions) for display, playback, etc., as appropriate for the given file type.

Figure 3:
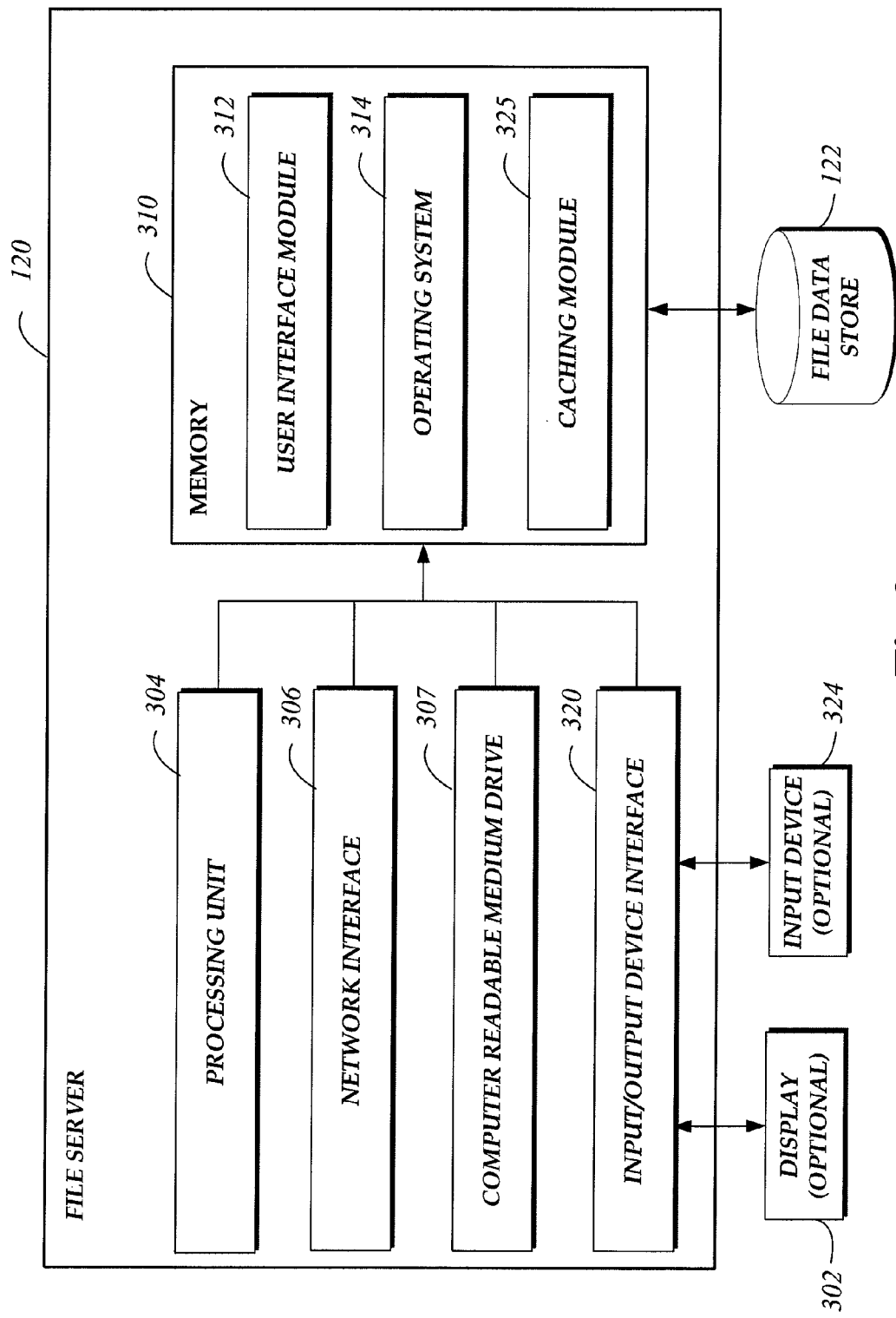
FIG. 3 depicts a general architecture of a file server for determining shared portions of files, and for sending files to a client computing device.

FIG. 3 depicts a general architecture of the file server 120 illustrated in FIG. 1. The embodiment of file server 120 depicted in FIG. 3 includes an arrangement of computer hardware and software components that may be used to implement aspects of the present disclosure. Those skilled in the art will appreciate that the file server 120 may include many more (or fewer) components than those shown in FIG. 3. It is not necessary, however, that all of these generally conventional components be shown in order to provide an enabling disclosure. As illustrated in FIG. 3, the file server 120 includes a network interface 306, a processing unit 304, an input/output device interface 320, and a computer readable medium drive 307, all of which may communicate with one another by way of a communication bus. As illustrated, the file server 120 is optionally associated with, or in communication with, a display 302, and an input device 324. The network interface 306 may provide the file server 120 with connectivity to one or more networks or computing systems. The processing unit 304 may thus receive information and instructions from other computing systems or services via a network. The processing unit 304 may also communicate to and from memory 310 and further provide output information for an optional display 302 via the input/output device interface 320. The input/output device interface 320 may accept input from the optional input device 324, such as a keyboard, mouse, digital pen, touch screen, or gestures recorded via motion capture.

The memory 310 contains computer program instructions that the processing unit 304 executes in order to implement one or more embodiments of the present disclosure. The memory 310 generally includes RAM, ROM and/or other persistent or non-transitory memory. The memory 310 may store an operating system 314 that provides computer program instructions for use by the processing unit 304 in the general administration and operation of the file server 120. The memory 310 may further include other information for implementing aspects of the present disclosure. For example, in one embodiment, the memory 310 includes a user interface module 312 that facilitates generation of user interfaces (such as by providing instructions therefor) for display upon a computing device. For example, a user interface may be displayed via a navigation interface such as a web browser installed on the computing device. In addition, memory 310 may include or communicate with an auxiliary file data store 122, discussed above.

In addition to the user interface module 312, the memory 310 may include a caching module 325 that may be executed by the processing unit 304. In one embodiment, the caching module 325 may be used to implement various aspects of the present disclosure, such as comparing one or more files to identify shared portions that may be cached by a client computing device, as described further below. In certain embodiments of the present disclosure, the client computing device 102 may include several components that operate similarly to the components illustrated as part of the file server 120, including a user interface module, processing unit, computer readable medium drive, etc.

Figure 4:
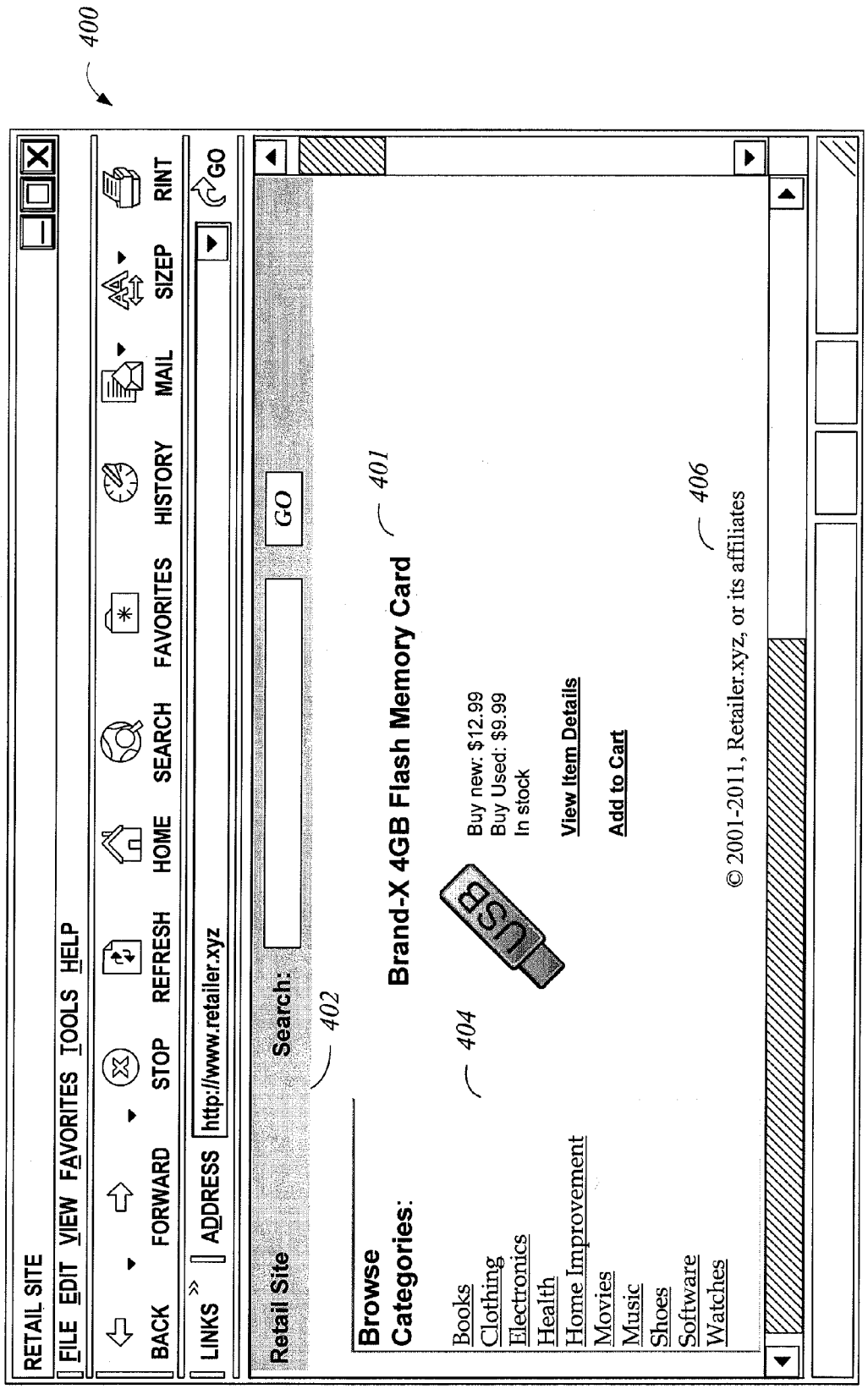
FIG. 4 is an illustrative user interface generated by the file server that includes shared portions of a page to be stored in the cache data store.

FIG. 4 is an illustrative user interface 400 generated by the file server 120 that includes shared portions 402, 404 and 406 to be stored by the client computing device 102 in the cache data store 112. Illustrative user interface 400 may be presented for display, for example, on a browser operating on the client computing device 102. User interface 400 may be considered to display the content of a first page, such as an HTML page, received from the file server 120, as discussed above with reference to FIG. 2A. The user interface 400 may include content determined by the client computing device 102 by interpreting and/or executing script or code within the first received page. The user interface 400 includes text content 401, reading in part "Brand-X 4 GB Flash Memory Card." For purposes of example, text content 401 may be considered unique to the first page (which is displayed in user interface 400), and was not designated as a shared portion to be separately stored for cache purposes in the cache data store 112. In contrast, each of the content portions 402, 404 and 406 may have been, for purposes of example, designated in the received file as a shared portion by a cache identifier marking each of the content portions 402, 404 and 406. For example, the text and/or code that caused the client computing device 102 to display the "Browse categories" content portion 404 may have been marked in the page received from the file server 120 as a shared portion to be separately cached in the cache data store 112 along with a cache identifier identifying the content portion 404. For illustrative purposes, the first page received from the file server 120 may have included text or code similar to the following, which may indicate to the client computing device 102 that shared portion 406 should be stored in the cache data store 112:

<CACHEABLE ACTION=save NAME=Footer EXPIRES=2011/03/01>

© 2001-2011, Retailer.xyz, or its affiliates

</CACHEABLE>

As a result of the above illustrative partial content of the first page received from the file server 120, the client computing device 102 may store the shared text portion 406, "© 2001-2011, Retailer.xyz, or its affiliates," in the cache data store 112, along with a cache identifier "Footer" that identifies the shared text portion 406. The "Footer" cache identifier and associated illustrative HTML tags above may have been previously added automatically by the file server 120 to the first page, such as by the methods described below with reference to FIG. 6, or by an author or creator associated with the first page. The cache identifier may have been added, for example, because the text "© 2001-2011, Retailer.xyz, or its affiliates" may be included in a large number of different pages or other files stored in the file data store 122 associated with or accessible by the file server 120. Similarly, the content portions 402 and 404 may be included in one or more additional pages or files stored in the file data store 122.

Figure 5:
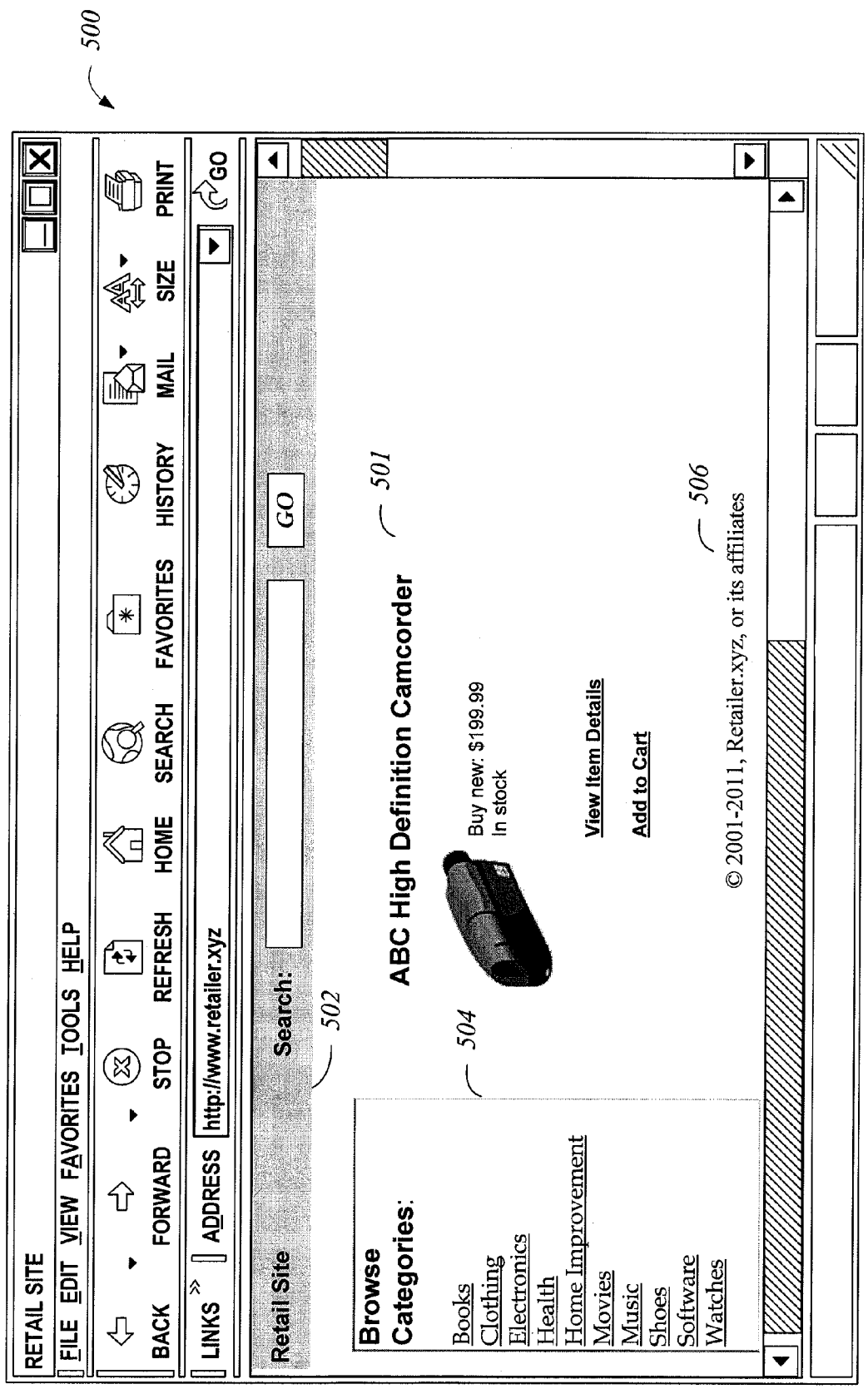
FIG. 5 is an illustrative user interface generated in part by the file server that includes shared portions of a page retrieved from the cache data store by the client computing device.

FIG. 5 is an illustrative user interface 500 generated in part by the file server 120 that includes shared portions 502, 504 and 506 retrieved from the cache data store 112 by the client computing device 102. Illustrative user interface 500 may be presented for display, for example, on a browser operating on the client computing device 102. User interface 500 may be considered to display the content of a second or subsequent page, such as an HTML page, received from the file server 120, as discussed above with reference to FIG. 2B. For example, the second page, which is displayed in user interface 500, may have been received by the client computing device 102 after the shared content portions 402, 404 and 406 discussed above with reference to user interface 400 have been stored in the cache data store 112. As illustrated, content portions 502, 504 and 506 of user interface 500 are identical to content portions 402, 404 and 406, respectively, of user interface 400. Accordingly, the file server 120 may have sent to the client computing device a modified second page, rather than the second page stored in file data store 122. The modified second page may have included the content displayed in content portion 501, but not included the content displayed in content portions 502, 504 and 506. For example, instead of sending the content portion 506, which is identical to the content portion 406 previously stored by the client computing device 102, the file server 120 may have included in the modified second page text or code similar to the following, which may indicate to the client computing device 102 that the shared portion previously identified with the cache identifier "Footer" should be retrieved from cache data store 112 and displayed: "<CACHEABLE ACTION=retrieve NAME=Footer></CACHEABLE>." In response to receiving the modified second page, the client computing device may have retrieved the text "© 2001-2011, Retailer.xyz, or its affiliates" from the cache data store 112 based on the "Footer" cache identifier in the modified second page. The client computing device may then have caused display of the modified second page in user interface 500, including shared portions 502, 504 and 506 retrieved from the cache data store 112.

Figure 6:
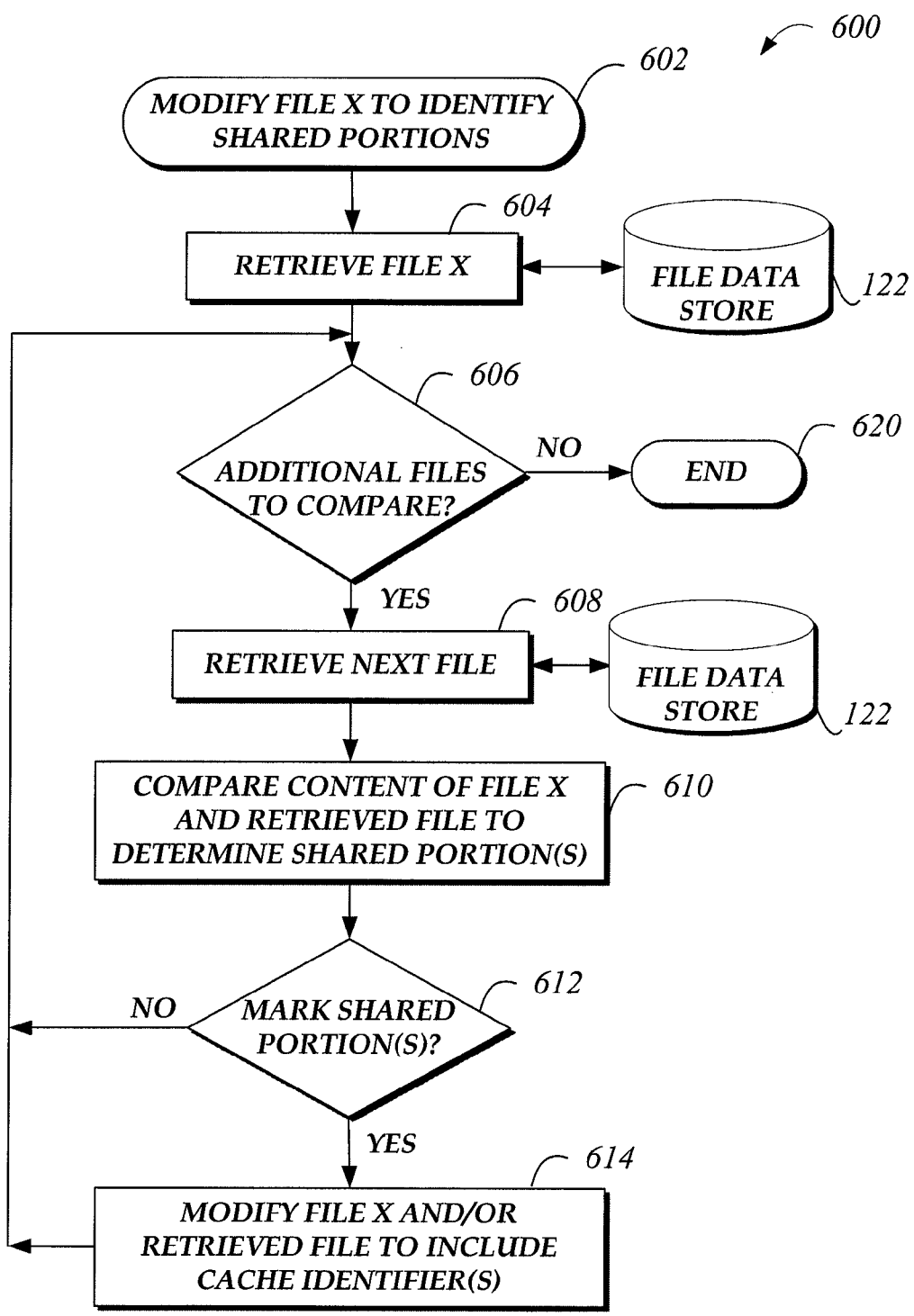
FIG. 6 is a flow diagram of an illustrative method implemented by the file server to modify a file to identify shared portions.

FIG. 6 is a flow diagram of an illustrative method 600 implemented by the file server 120 to modify a file to identify shared portions in the file. The illustrative method 600 may be implemented at least in part by the caching module 325. While the method 600 is illustrated using the example of a single file (designated as "file X") being compared to other files, in some embodiments, the illustrated method may be implemented by the file server 120 for each file in file data store 122, or for a subset of the files. For example, in some embodiments, the file server 120 may modify each file in file data store 122 to identify shared portions on a periodic basis, such as nightly, weekly, etc. In other embodiments, the file server 120 may modify one or more files in file data store 122 to identify shared portions in response to a triggering event, such as the content of a file being changed or a new file being stored in the file data store 122. In other embodiments, the illustrated method 600 may be implemented for file X in response to a client computing device, such as the client computing device 102, requesting file X from the file server 120. As discussed above, in some embodiments, instead of or in addition to the file server 102 modifying files to identify shared portions as illustrated in method 600, shared portions may be explicitly marked or indicated by an author or creator of each file.

The method 600 begins at block 602, then proceeds to block 604, where the file server 120 retrieves file X from file data store 122 or another data store. File X may be any file stored in the file data store 122, or in another data store, that the file server 120 will compare to other files to determine whether any common content or shared portions are present in the file X. At block 606, the file server 120 determines whether there are additional files to compare to file X (for example, files that should be compared to file X, but which have not yet been compared to file X during the current implementation of illustrative method 600). If the file server 120 determines at block 606 that there are no additional files to compare to file X, the method ends at block 620. If instead the file server 120 determines at block 606 that there are one or more additional files to compare to file X, the file server 120 proceeds to block 608, where the file server retrieves from file data store 122 the next file to be compared to file X.

Once the file server 120 has retrieved the next file, the file server 120 proceeds to block 610. At block 610, the file server 120 compares the content of file X and the content of the retrieved file to determine shared portions, if any. File X and the retrieved file may be compared, for example, according to known document comparison techniques. The result of the comparison at block 610, in some embodiments, may be one or more portions of content (such as text content, audio content, video content, etc.) that were determined by the file server 120 to be included in both file X and the retrieved file. The illustrative method 600 then proceeds to block 612, where the file server 120 determines whether to mark or tag any shared portions that were determined at block 610. As used herein, "marking" a shared portion may generally refer to storing some indication that a certain portion of a file is a shared portion that may be separately cached by a client computing device when the file is received by the client computing device from file server 120. In some embodiments, the file server 120 may mark every shared portion determined at block 610. In other embodiments, only shared portions of a certain length or size (such as a predetermined minimum number of characters, words, lines, bytes, etc.) may be marked by the file server 120. In some embodiments, the file server 120 may only mark shared portions if the shared portions occur in at least a certain number of files stored in file data store 122, in which case the file server may increase a counter for a given shared portion of content for each retrieved file that is found by the file server 120 to include the shared portion (not illustrated in method 600). In other embodiments, the file server 120 may only mark shared portions of content that are included in frequently requested files or pages, or may generally consider the relative number of client requests for a given file when determining whether to mark a shared portion that is included in the file.

If the file server 120 determines at block 612 not to mark any shared portions (or if no shared portions were determined at block 610), the method proceeds to block 606 to determine whether there are additional file to compare to file X. Alternatively, if the file server 120 determines at block 612 that the file server 120 should mark one or more shared portions, the method 600 proceeds to block 614. At block 614, the file server 120 may modify file X and/or the retrieved file to include a cache identifier or other indication of a cacheable portion for each shared portion to be marked. In some embodiments, the cache identifier may include unique identification information that is automatically generated by the file server 120. For example, the cache identifier may include a unique number or letter sequence for each shared portion, such that each time the file server marks the same shared portion in different files, the file server uses the same unique cache identifier. For example, the file server 120 may include in the file data store 122, or another data store, cache association information associating each cache identifier that the file server 122 has marked in any file, along with an associated shared portion of content for each cache identifier. When the file server 120 determines that a shared portion found in file X has already been marked in one or more other files, the file server may retrieve the appropriate cache identifier from the cache association information stored in file data store 122 and include it in file X. If the file server 120 determines that the given shared portion found in file X has not been marked in any files previously, the file server 120 may create a new cache identifier that has not been used previously. The file server 120 may then add this new cache identifier to file X and update the stored cache association information to include the new cache identifier and the associated shared portion.

For illustrative purposes, consider that the shared portion determined at block 610 is the text "Frequently used text." At block 614, the file server 614 may modify this portion of text in file X and/or the retrieved file to read "<CACHEABLE NAME=P123> Frequently used text </CACHEABLE>," where the cache identifier "P123" has been automatically generated by the file server 120. In other embodiments, marking file X may include removing the shared portion itself from file X, and replacing the shared portion with the corresponding cache identifier. In such embodiments, the file server 120 may place the shared portion back into the file X when the file X is requested by a client computing device that has not yet cached or stored the given shared portion. Once the file server 120 has modified file X and/or the retrieved file to include any cache identifiers, the method 600 proceeds to block 606 to determine whether there are additional files to compare to file X.

The above methods discussed throughout the present disclosure may result in smaller files being sent from the file server 120 to the client computing device 102, because previously cached shared portions may be sent only once, rather than being sent again for subsequent file requests. The above methods may additionally or alternatively result in decreasing the number of connections or requests from the client computing device 102 to the file server 120, because content may be included in a single file, where the same content might otherwise be split into multiple files in order to take advantage of the existing full file caching of other systems. As will be appreciated, enabling caching of portions of a file and other aspects of the present disclosure may be implemented for a variety of file types. For example, a news video file or content stream may include a frequently used introduction portion or stock footage that is shared between multiple files or feeds, and which may be treated as a shared portion as discussed herein. As another example, streaming audio data, such as a radio program, may include advertisements that are reused and may be separately cached according to aspects of the present disclosure. Accordingly, many types of content accessible over a network may benefit from aspects of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for enabling caching of one or more portions of a page, the system comprising:
   a data store that stores a plurality of pages, the plurality of pages including a first page and a second page, wherein individual ones of the plurality of pages comprise text; and
   a computing device in communication with the data store and that is configured to:
   automatically determine at least one shared portion of text, wherein the shared portion comprises text that is included in both the first page and the second page, wherein determining the at least one shared portion comprises comparing text of at least the first page and the second page;
   automatically add a cache identifier to both the first page and the second page, wherein the cache identifier indicates that the shared portion of text may be cached by a client system that receives at least one of the first page and the second page;
   in response to receiving a first request from the client system for the first page, send to the client system the first page, wherein the first page sent to the client system includes the cache identifier and the shared portion of text;
   in response to receiving from the client system a second request, said second request comprising a request for the second page, determining whether the client system has stored the shared portion of text associated with the cache identifier in the second page, wherein the determination whether the client system has stored the shared portion of text is based at least in part by determining whether a page that includes the cache identifier and the shared portion of text has been sent to the client system prior to receiving the second request from the client system;
   when the determination is that the client system has not stored the shared portion of text, send to the client system the second page without modifying the shared portion of text within the second page, wherein the second page sent to the client system includes the cache identifier and the shared portion of text; and
   when the determination is that the client system has stored the shared portion of text, send to the client system a modified second page, wherein the modified second page includes the cache identifier and does not include the shared portion of text, such that the client system can determine the text of the second page based on the modified second page and the stored shared portion of text.

2. The system of claim 1, wherein the determination of whether the client system has stored the shared portion of text is further based at least in part on an indication received from the client system.

3. The system of claim 1, wherein the determination of whether the client system has stored the shared portion of text is further based at least in part on information identifying a browser operating on the client system.

4. A system for enabling caching of one or more portions of a file, the system comprising:
   a data store that stores a plurality of files, the plurality of files including a first file and a second file; and
   a computing device in communication with the data store and that is configured to:
   in response to receiving a first request from a client system for the first file, send to the client system the first file, wherein the first file sent to the client system includes a cache identifier identifying a shared portion of content of the first file, said shared portion of content comprising content that is included in both the first file and at least one other file, wherein the at least one other file includes the second file;

in response to receiving from the client system a second request, said second request comprising a request for the second file, wherein the second file includes the cache identifier, determining whether the client system has stored the shared portion of content of the first file associated with the cache identifier in the second file, wherein the determination whether the client system has stored the shared portion of content is based at least in part by determining whether a file that includes the cache identifier and the shared portion of content has been sent to the client system prior to receiving the second request from the client system;

when the determination is that the client system has not stored the shared portion of content, send to the client system the second file without modifying the shared portion of content within the second file, wherein the second file sent to the client system includes the shared portion of content; and when the determination is that the client system has stored the shared portion of content, send to the client system a modified second file, wherein the modified second file includes the cache identifier and does not include the shared portion of content, such that the client system can determine the content of the second file based on the modified second file and the stored shared portion of content.

5. The system of claim 4, wherein the computing device is further configured to, prior to sending the first file to the client system:

automatically determine at least the shared portion of content, wherein determining the shared portion of content comprises comparing content of at least the first file and the second file; and automatically add the cache identifier to at least one of the first file and the second file.

6. The system of claim 4, wherein the first file and the second file each comprise at least one of a page, a text file, an image file, a video file and an audio file.

7. The system of claim 4, wherein the shared portion of content comprises code.

8. The system of claim 4, wherein the shared portion of content comprises at least one of text data, audio data and video data.

9. A computer-implemented method for enabling caching of one or more portions of a file, the computer-implemented method comprising:

as implemented by one or more computing devices configured with specific executable instructions, receiving from a client system a first request for a first file;

in response to the first request, sending to the client system the first file, wherein the first file sent to the client system includes a cache identifier identifying a shared portion of content of the first file, said shared portion of content comprising content that is included in both the first file and at least one other file;

receiving from the client system a second request, said second request comprising a request for a second file, wherein the second file includes the shared portion of content and the cache identifier;

determining whether the client system has stored the shared portion of content associated with the cache identifier in the second file, wherein the determination whether the client system has stored the shared portion of content is based at least in part by determining whether a file that includes the cache identifier and the shared portion of content has been sent to the client system prior to receiving the second request from the client system;

when the determination is that the client system has not stored the shared portion of content, sending to the client system the second file without modifying the shared portion of content within the second file; and when the determination is that the client system has stored the shared portion of content, sending to the client system a modified second file, wherein the modified second file includes the cache identifier and does not include the shared portion of content, such that the client system can determine the content of the second file based on the modified second file and the shared portion of content.

10. The computer-implemented method of claim 9, wherein the cache identifier included in the first file sent to the client system provides an indication that the client system should store the shared portion of content.

11. The computer-implemented method of claim 9, further comprising creating the modified second file.

12. The computer-implemented method of claim 11, wherein creating the modified second file comprises identifying one or more cache identifiers in the second file.

13. The computer-implemented method of claim 11, wherein creating the modified second file comprises determining one or more portions of content of the second file that have previously been sent to the client system.

14. The computer-implemented method of claim 11, wherein the determination of whether the client system has stored the shared portion of content is further based at least in part on an indication received from the client system.

15. The computer-implemented method of claim 9, wherein the determination of whether the client system has stored the shared portion of content is further based at least in part on information identifying a browser operating on the client system.

16. A non-transitory, computer-readable medium storing computer executable instructions that, when executed by one or more computing devices, configure the one or more computing devices to perform operations comprising:

causing a first file to be sent to a client system, wherein the first file includes a cache identifier identifying a shared portion of content of the first file, wherein the shared portion of content is a subset of the content of the first file;

in response to receiving from the client system a request for a second file, wherein the second file includes the shared portion of content and the cache identifier, determining whether the client system has stored the shared portion of content associated with the cache identifier in the second file, wherein the determination whether the client system has stored the shared portion of content is based at least in part by determining whether a file that includes the cache identifier and the shared portion of content has been sent to the client system prior to receiving the request for the second file;

when the determination is that the client system has not stored the shared portion of content, sending to the client system the second file without modification to the shared portion of content within the second file; and when the determination is that the client system has stored the shared portion of content, sending to the client system a modified second file, wherein the modified second file includes the cache identifier and does not include the shared portion of content.

17. The non-transitory, computer-readable medium of claim 16, wherein the shared portion of content comprises code.

18. The non-transitory, computer-readable medium of claim 16, wherein the shared portion of content comprises at least one of text data, audio data and video data.

19. The system of claim 1, wherein the first page is the page that includes the cache identifier and the shared portion of text that has been sent to the client system prior to receiving the second request.

\* \* \* \* \*